Figure 1:
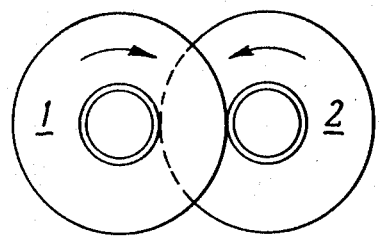

United States Patent

[11] 3,549,000

| [72] | Inventors | Joseph D. Christian, deceased, late of San Francisco, Calif., by Marcella B. Christian and Robert F. Christian, executors; Robert F. Christian, San Francisco, Calif. |
|---|---|---|
| [21] | Appl. No. | 747,412 |
| [22] | Filed | July 22, 1968 |
| [45] | Patented | Dec. 22, 1970 |
| [73] | Assignee | Packaged Power Terminals Inc. San Francisco, Calif. |
| [32] | Priority | July 31, 1967, 34,993/67, Sept. 22, 1967, 43,164/67 |

[54] SCREW CONVEYOR APPARATUS
9 Claims, 13 Drawing Figs.

[52] U.S. Cl. .................................................. 198/64, 103/128, 198/213
[51] Int. Cl. ........................................... B65g 33/00, B65g 47/16
[50] Field of Search ............................... 198/64, 213; 222/412, 413; 103/128

[56] References Cited
UNITED STATES PATENTS

| 882,304 | 3/1908 | Eitle ............................ | 198/213X |
| 2,693,873 | 11/1954 | Martin .......................... | 198/213 |
| 3,043,480 | 7/1962 | Wittrock ....................... | 222/413X |

FOREIGN PATENTS

| 88,858 | 6/1922 | Austria ......................... | 198/213 |

Primary Examiner—Edward A. Sroka
Attorney—Young & Thompson

ABSTRACT: A screw conveyor apparatus comprises a housing 7 (FIG. 6) having an inlet 6 (FIG. 8) and outlet 6A (FIG. 9), a plurality of screw conveyors, 1, 2, 3, 4, rotatably mounted within the housing with their flights in an overlapping relationship, at least one of the conveyors being axially movable; and driving means (15 to 36) for rotating the screw conveyors and axially moving said axially movable conveyor while it rotates.

SCREW CONVEYOR APPARATUS

This invention relates to a screw conveyor apparatus for conveying and/or processing materials in fluid form especially materials which consist of discrete particles or slurries. A screw conveyor is a spiral, worm or helical flighted device having hollow or solid flights formed by solid or perforated ribbons or blades. Such a device is usually arranged within a housing so as to transmit material in a horizontal, vertical or inclined direction when rotated. With hollow blades or flights a heat transfer medium can be passed therethrough to establish heat exchange with the material being processed. The heat transfer medium may be, for example, steam, oil or brine. The flights are mounted on a solid or hollow pipe member usually cylindrical in shape which is known as the "-standard" or the "pipe standard".

In general, the function of conveying materials and of processing materials must take account of materials which are relatively free flowing and tend to adhere to the flights and maintain this adherent property during treatment.

This latter condition is particularly undesirable when processing foods or chemicals at temperatures greater or less than the normal ambient. This condition is especially undesirable in conveyors with hollow flight helices in which steam or hot oil or brine or some other heat transfer medium is circulated to establish a heat exchange relationship with the material being processed.

If the material tends to adhere to the flights, such adhesion will:

I. Insulate the heat exchange surface;
II. Over or under process the material causing uneven product characteristics; and
III. Sometimes cause discoloration, burn-on, caramelizing, lumpiness, and other undesirable phenomena.

Materials that tend to stick to the conveying surface may also have highly variable characteristics, both as to the nature of particle composition and phase change during the processing stages. This usually results from the temperature of the material reaching one or more critical temperatures.

One object of the invention is to improve the mixing or particle relocation of the material as it moves through the apparatus.

Another object of the invention is to clean the surfaces of the screws and/or housing.

According to the invention there is provided a screw conveyor apparatus comprising:

a. a housing having an inlet and an outlet;
b. a plurality of screw conveyors rotatably mounted within said housing with their flights in an overlapping relationship, at least one of said conveyors being axially movable; and
c. driving means for rotating the screw conveyors, and axially moving said axially movable screw conveyor to move back and forth in alternate axial directions with a stroke greater than the median distance between the face of one of the flights of said at least one screw conveyor and an adjacent face of one of the flights of the next adjacent screw conveyor, wherein at the ends of the stroke, the resilient means permits absorption of axial thrust and allows said at least one axially movable screw conveyor to dwell at the ends of the stroke for a certain time.

Thus the screw conveyors are caused to approach each other and recede from each other so as to more effectively mix the material or cause it to move over the surfaces of the screws to increase the heat exchange coefficient, and if desired the screws may touch each other to effect cleaning.

There may be two, three or more screws arranged with their axes substantially parallel. The parallel axes of the screws can be on any relative disposition within 360°. If three screws are used, the axes of all three may be on a horizontal line or arranged so that lines intersecting the axes perpendicularly form a triangle. If four screws are used, their axes could lie on a straight line or on a pair of lines with the axes of two screws located above the axes of two other screws.

The screws may be of the same hand, i.e., two right-hands or two left-hands, or more than two right-hands or two left-hands, but our preferred arrangement would be to have the same number of right-hand screws as left-hand screws and arrange them alternately right and left-hand in interfolding relationship to each other. All the screws may have solid or hollow flights or a mixture of hollow and solid flighted screws may be provided.

Each of the screws may be of a length from 3 or 4 feet up to say 20 feet. However, for some applications smaller or larger screws may be required. Each of the screws has a bearing at each of its ends and is rotatable. As an example, in a preferred embodiment which will be described, the screws are of the 12-inch diameter with a 6-inch pitch and are mounted on standards of 4½ inches outside diameter.

Figure 2:
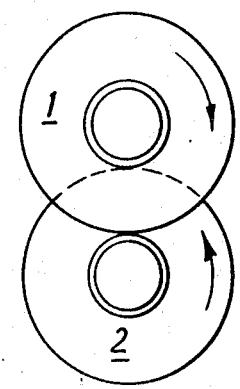
Figure 3:
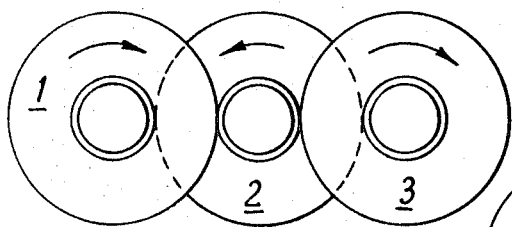
Figure 4:
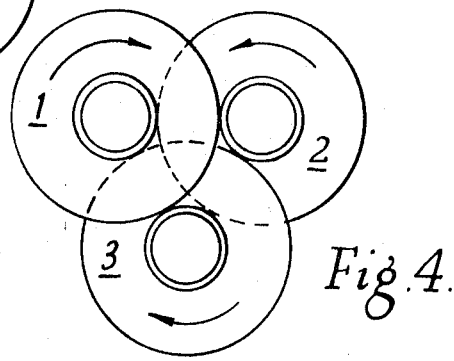
Figure 6:
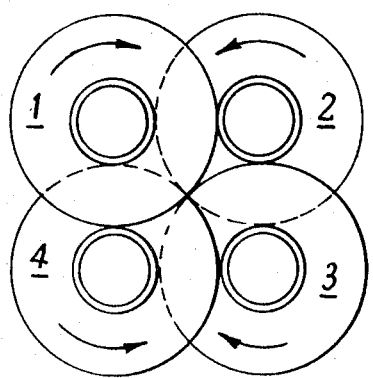
Figure 5:
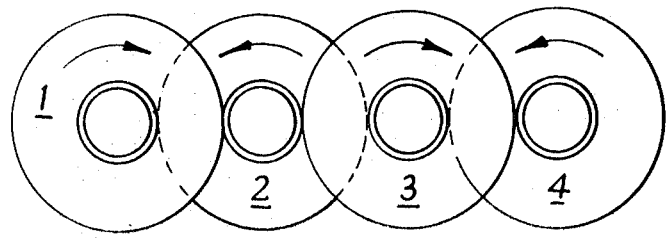
Figure 7:
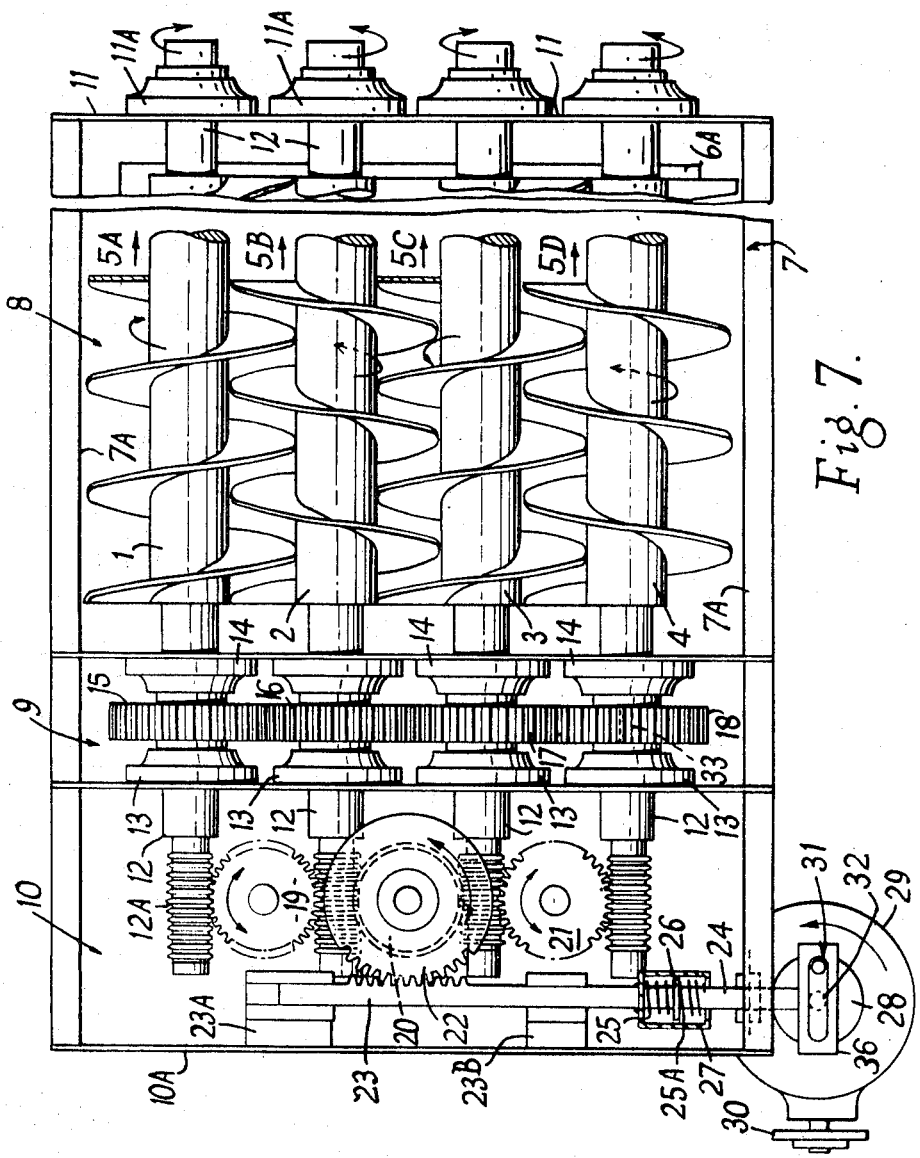
Figure 8:
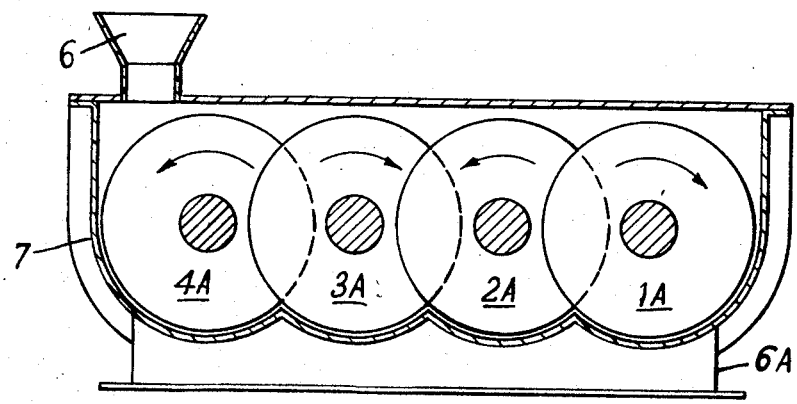
Figure 9:
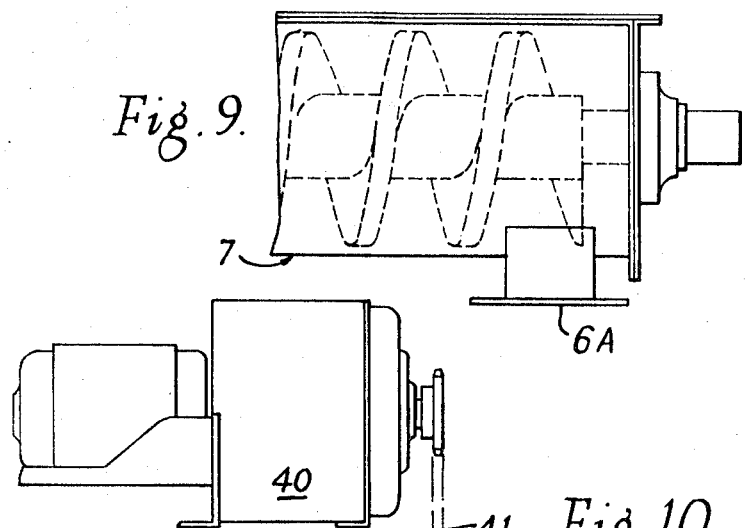
Figure 10:
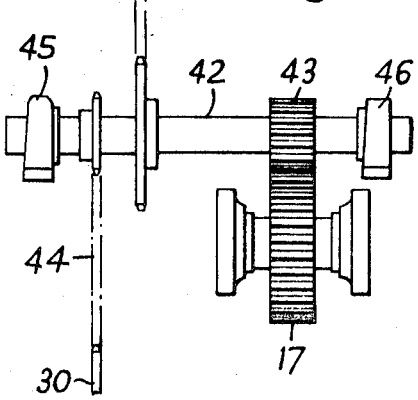
Figure 11:
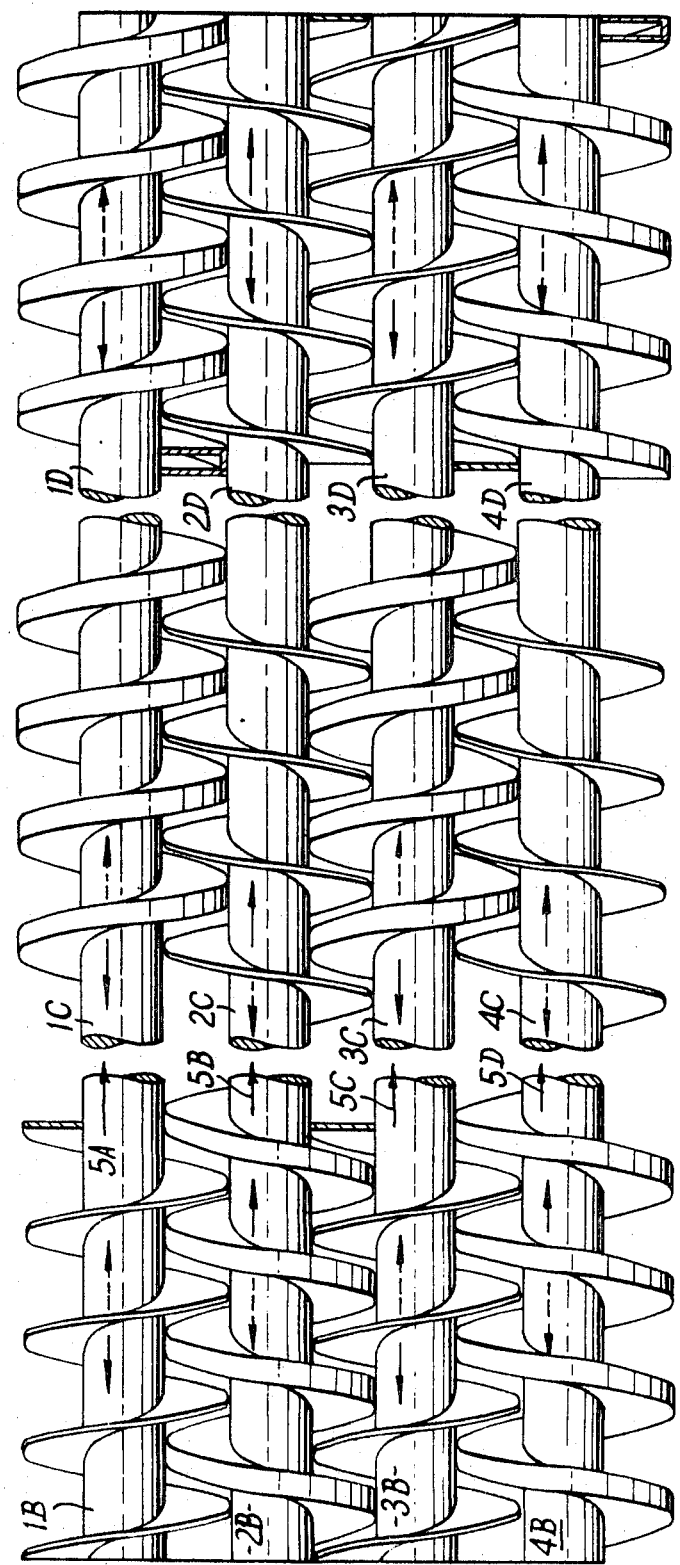
Figure 12:
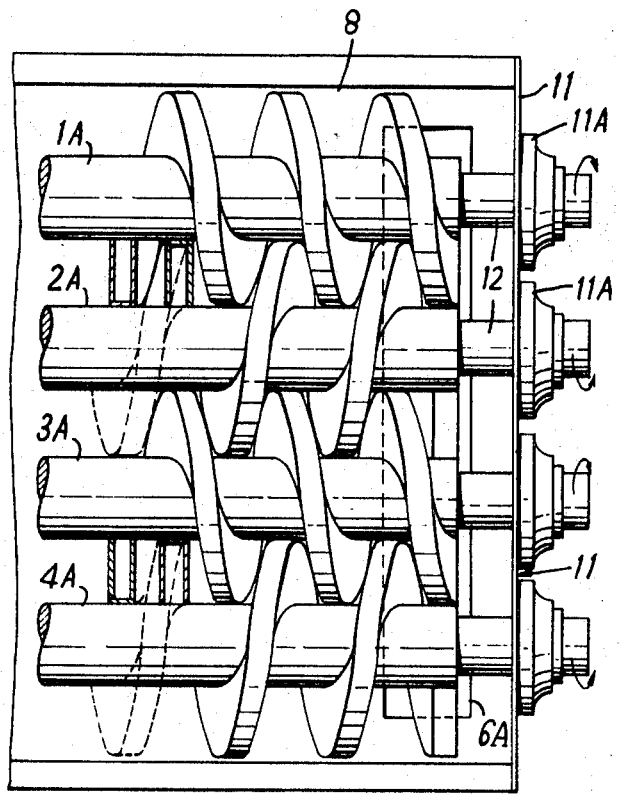
Figure 13:
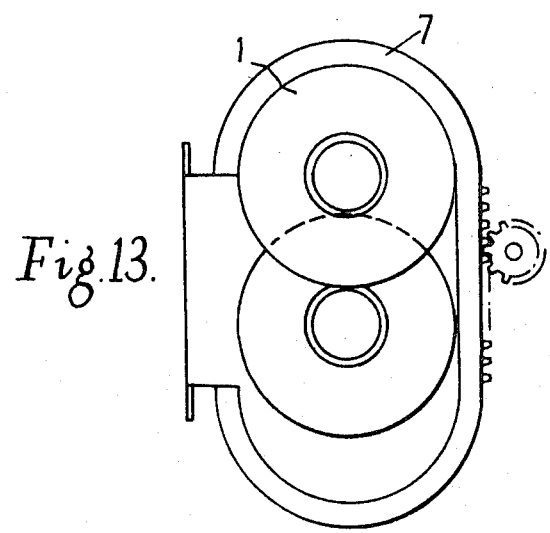

The invention will now be described in more detail with reference to the accompanying drawings, wherein:

FIGS. 1 to 6 show optional arrangements of screws, more particularly:

FIG. 1 shows two screws in end elevation;
FIG. 2 shows two screws in end elevation;
FIG. 3 shows three screws in end elevation;
FIG. 4 shows three screws in end elevation;
FIG. 5 shows four screws in end elevation;
FIG. 6 shows four screws in end elevation;
FIG. 7 is a plan view of a self-cleaning screw-conveyor apparatus made in accordance with the invention, with the housing partly removed to show the particular arrangement of the screws and drive means;
FIG. 8 is a transverse sectional view of the apparatus according to FIG. 7 showing the direction of rotation of the screws;
FIG. 9 is an end elevation of the discharge end of the apparatus according to FIG. 7;
FIG. 10 is a schematic diagram of a prime mover for the apparatus according to FIG. 7;
FIG. 11 is a side elevation of three alternative arrangements of screws for the apparatus made in accordance with the invention;
FIG. 12 shows a modification with hollow screws; and
FIG. 13 shows a modification to be described.

Referring to FIGS. 1 to 6, FIG. 1 shows two screws, numbered respectively 1 and 2 with axes lying in a horizontal plane. One of these is right-hand and the other is left-hand. However, either one could be of either hand but their direction of rotation should be respectively clockwise and counterclockwise so that they could be geared together with timing gears.

FIG. 2 shows another arrangement of two screws, designated 1 and 2 with axes lying in a vertical plane. The screws are preferably arranged so that either one is right-hand and the other is left-hand and geared together for respective clockwise and counterclockwise rotation. However, both screws could be of the same hand and both screws could rotate in the same direction. To accomplish this type of rotation, the screws could be connected with chains and sprockets rather than with timing gears.

FIG. 3 is an arrangement of three screws with axes lying in a horizontal plane in which screws 1 and 3 are of one hand and screw 2 is of the opposite hand. The direction of rotation could be as shown in the drawing, and to accomplish this, the screws could be geared together with timing gears.

FIG 4 shows another construction of three screws arranged so that lines intersecting their axes perpendicularly form a triangle. It is preferred that screws Nos. 1 and 2 be of opposite hands and geared together with screw 3 so that two of the screws are of one hand whilst the third screw is of the opposite hand.

FIG. 5 is a preferred arrangement of four screws with axes lying in a horizontal plane, as shown, or a vertical plane. Screws 1 and 3 are of the same hand and 2 and 4 are of the opposite hand. This arrangement is incorporated in the apparatus to be described more fully in conjunction with FIG. 7.

FIG. 6 is an alternate arrangement of four screws with axes lying in two horizontal planes one above the other. Two of the screws are again of one hand whilst the other two are of the opposite hand. Two screws rotate clockwise and two screws rotate counterclockwise. The screws can be connected together with the timing gears.

It should be pointed out that the arrangement of screws in FIG. 4 and FIG. 6 is ideal for installation within tubular housings, whereas the arrangements in FIG. 1, FIG. 3 and FIG. 5 are ideal for arrangements in housings such as is illustrated in FIG. 7. The arrangement of FIG. 2 is ideal for a deep U-shaped trough housing. Whilst FIG. 2 only shows two screws, one above the other, this arrangement could be modified to include three or four screws one above another and located in a deep vertical walled U-shaped trough. In these arrangements, the drive mechanism shown in FIG. 7 is easily modified to suit the particular conditions. In other words, the rotational arrangement shown in FIG. 8 is a plan view but it could be imagined as an end elevation of the four screws which are located vertically one above another.

Referring now to FIG. 7, a preferred embodiment of an apparatus is shown with screws illustrated with nonhollow flights.

As shown in FIG. 7 four screws are provided parts 1 and 3 being right-hand nonhollow screws and parts 2 and 4 being left-hand nonhollow screws. The screws are mounted with their axes parallel in a housing with a contoured trough-shaped wall which forms the bottom of the housing, shown on FIG. 8. The numerals 5A, 5B, 5C and 5D indicate the direction of flow of material when the screws are rotated and as shown this flow is away from an inlet end of the apparatus and the drive means and towards the discharge end. The apparatus has an inlet opening 6 and a discharge opening 6A, as shown in FIG. 8. The housing designated 7 in FIGS. 7 and 8 has a number of sections, a first section 8 is the compartment in which the screws are mounted for operation. A second section 9, which is a compartment in which timing gears are mounted for operation and a third section 10 is a compartment in which the oscillation gearing and thrust bearings are mounted for operation. At the end of section 10 is a cover plate 10A secured by a flange fit to section 10. Section 10 is flanged and bolted to section 9 and likewise section 9 is flanged and bolted to section 8. At the end of section 8 a flanged plate 11 is attached and the plate 11 carries the end bearings 11A for the screws.

Four identical drive shaft members, 12 one for each screw extend within the section 10 and are journaled in four bearings 13, and four bearings 14 located at the end of section 9 opposite to bearings 11A. The shafts 12 are secured to the screws, numbered 1, 2, 3 and 4, by conventional means so as to drive these screws for rotation.

Shafts 12 are machined with annular grooves 12A that conform in contour to a spur gear tooth cross section. Meshed with these grooves 12A are three pinions or gears 19, 20 and 21, each having teeth over two portions of its circumference. Superimposed over gear 20 and drivably connected therewith is another gear, about double its diameter which has been designated 22. The gear 22 is provided with teeth over approximately one-quarter of its circumference and these teeth engage a rack 23. The rack 23 is driven through a connecting rod 24 and is slidably mounted in bearings 23A, 23B carried by the plate 10A. The rod 24 has resilient means in the form of two springs 25 and 25A with a separating element 26 located between these springs 25, 25A and forming a stop therefor. The springs 25, 25A and the separating element are located in a subhousing 27. The connecting rod 24 is connected to a slotted plate 36 which can be driven by an adjustable eccentric drive. A crank pin 31 carried by a crank disc 28 engages in the slot of the plate 26 and can be positioned selectively relative to a center point 32 of the slot. The disc 28 is connected to a worm gear arrangement in a casing 29 driven by a takeoff chain sprocket 30 from a main drive means. If the crank pin is at the center 32, there will be no lateral movement of the rack 23, but, as the crank pin 31 is adjusted away from the center 32, the length of the travel of the rack 23 becomes greater. The stroke of the rack 23 is transmitted by gear 22 to the gears 19, 20 and 21. The gears 19, 20 and 21 move reciprocally in alternate directions of rotation and due to their engagement with the shafts 12 the shafts 12 are caused to move axially back and forth in the bearings 13, 14 and 11A and through axial bores in timing gears 15, 16, 17 and 18 mounted between the pairs of bearings 13, 14 and meshing with one another as shown. Each bore of the gears 15, 16, 17 and 18 has a keyway 33 corresponding to a keyway in the shaft so that axial movement of the shafts 12 is permitted without disturbing the relationship of the engagement of the gears 15 to 18. It will be seen that as gears 19, 20 and 21 rotate in one direction the screws 1 and 3 will move in one axial direction and the screws 2 and 4 will move in the opposite axial direction. Then, as the direction of rotation of the gears 19, 20 and 21 reverse due to the stroke of the rack 23, the direction of axial travel is reversed in the four screws 1 to 4. The timing gears 15, 16, 17 and 18 preferably have a one to one ratio. As an alternative to the provision of keyways shown in FIG. 7 the tooth contact width between meshing gears can be made sufficiently large to ensure that when the gears 15 to 18 move axially relative to one another there is always enough contact between gears to impart the rotary motion to the screws at all times during operation.

If desired the sprocket 30 can be connected with a clutch, not shown, so that the gearing in casing 29 and the rack 23 would only be driven when this clutch is engaged. If the clutch was disengaged there would be no axial movement of the screws 1 to 4 even though rotational movement was still taking place.

Alternatively, a mechanism can be connected to the axial driving means so as to cause the rack 23 to perform intermittent reciprocal motion.

FIG. 10 illustrates a prime mover for axial and rotary driving means and consisting of a motor 40 with speed-reduction gearing coupled with a chain drive 41 to a shaft 42. The shaft 42 carries a pinion 43 which engages the gear 17 but could engage any one of the four timing gears 15 to 18, shown in FIG. 1, and is mounted in bearings 45, 46. The shaft 42 also drives the sprocket 30 in FIG. 7, via a further chain drive 44.

As a typical example the screws 1, 2, 3, 4 would be driven at a rotational speed of about 6 r.p.m. with an axial oscillation of 2 strokes per minute.

One advantage of utilizing the rotary arrangement shown in FIG. 8 is that simple spur gears each coupled to a screw and meshing one with another is all that is required to achieve this arrangement.

Referring back to FIG. 7, the parts contained in sections 9 and 10 preferably run in oil contained therein. The screws 1 to 4 are of the same diameter and have a pitch about one-half of this diameter.

The screws 1 to 4 are arranged so that the outer edges of the flights on one screw touches or nearly touches the standard of an adjacent screw. The outer edges of the flights on the screws 1 and 4 are preferably closely adjacent the inner side 7A of the longitudinal walls of the housing 7.

Due to the relative axial displacement of the screws 1 to 4 the facing walls of the flights of two adjacent screws can be brought into engagement or very close to one another at one or other of the limits of the stroke of the rack 23. The combined axial and rotational movement ensures material that is flowing through the apparatus is cleaned from the surfaces where it would otherwise be likely to accumulate.

Due to the fact that the crank pin 31 can be adjusted to lengthen or shorten the stroke the self-cleaning cycle can be varied according to the particular application and can range from an extensive self-cleaning action with a large stroke to virtually no self-cleaning action when the crank pin 31 is at the center 32 of the slot. Alternatively, the axial drive can be disconnected or intermittently connected to achieve the latter-mentioned condition, for instance by means of the clutch mentioned hereinbefore. Contrary to first impression, in some applications it may well be desirable to halt the cleaning action altogether since it causes wear and tear and is wasteful to continue if it is not strictly needed. For example, it may not be needed with a material that has changed its phase into a free-flowing material or a material that is free-flowing at all times.

When the apparatus is operating and the screws performing rotary and axial motion to convey material, thrust loads are developed in the screws which have to be contained and controlled. The rack and pinion mechanism 22, 23 and the pinions 19 to 21 achieve this object. The rack 23 may be round and the teeth of the pinions 21 to 22 are similar to those of worm wheel gear, i.e., without a lead angle. The pinion 22 is drivably connected to pinion 20 but since pivoting of any of the pinions 19, 20 or 21 causes axial movement of all the screws because the gears mesh with one another, the pinion 22 could equally well be drivably connected to pinion 19 or 21.

In this preferred constructional embodiment showing four screws all axially movable alternate screws move axially in the same direction. However, not all the screws need necessarily be driven axially; two screws, say 1 and 4, can move axially and rotate whilst the other screws 2 and 3 merely rotate. The particular arrangement of screws and whether each moves axially or not depends upon the application of the apparatus but an object is to have axial movement kept to a minimum. As an example, suppose an apparatus had 12-inch diameter screws of 6-inch pitch, with flights made of half-inch thick material, the pitch would be measured from center to center of the half-inch thick flights, leaving a face to face dimension of 5.5 inches. Considering two screws, the flights of the intermeshing screw would also be half-inch thick so the actual axial distance to be moved would be 5-inch if one screw was moved axially but only 2.5 inches if both screws moved axially.

Screws which are not required to move axially may have collars at each end to prevent axial movement, whilst the bearings of screws required to move axially preferably allow the screws to pass axially therethrough.

As shown in FIG. 12 the screws may carry hollow flights. The left-hand end of this apparatus is the same as in FIG. 7. The hollow flights are 1A, 2A, 3A and 4A, usually used for passing a heat exchange medium through the apparatus (in which event some means for circulating the medium are needed such as, for example, as shown in U.S. Pat. No. 2,731,241). The flights have a larger flight thickness and consequently require a shorter stroke to effect self-cleaning than do screws with thinner solid flights (1, 2, 3 and 4 in FIG. 7). Once again it can be seen that the adjustment of the length of stroke is of great advantage if screws are replaced. The actual flight thickness would vary according to many conditions; (a) whether the material to be processed or conveyed is abrasive or nonabrasive, (b) the diameter of the conveyors (flights would be thicker or larger diameters than on smaller diameters and the pitch would be greater on larger diameters than on smaller diameters), and (c) whether the flights were solid or hollow for carrying a heat exchange medium.

Solid flights could have thicknesses from about one-eighth inch to about one-half inch depending on the nature of the material to be processed. Hollow flights could have thicknesses from about 1.25 inches to about 1.5 inches and the pitch of hollow flighted screws must be large enough to allow intermeshing with another hollow flighted screw.

To cite an example of this variation, a hollow flighted screw 16-inch diameter would in an average case be built to 8-inch pitch and have a flight thickness of 1.5 inches and in such a case, the axial travel would be 5-inch or if two intermeshing screws were permitted to travel, each would travel 2.5 inches.

Ideally the pitch should be as small as possible to permit more helical faces per unit length of the screw. The shortest practicable pitch with 12-inch diameter hollow flighted screws could be about 4 inches and is typically 5 inches or 6 inches. With intermeshing of solid flighted screws and hollow flighted screws as shown and described hereinafter with reference to FIG. 11, the pitch can be reduced to about 3 inches and the above condition of having more contact faces is achieved. The closer the pitch the better the efficiency of heat exchange, if a heat exchange medium is being circulated, as the thickness of material on the contact faces reduces. It has been shown that an arrangement using intermeshing hollow flighted screws of 12-inch diameter with flights of 6-inch pitch on a standard of outside diameter 4.5 inches and employing a heat exchange medium gives results comparable to a solid flighted screw of the same dimensions but with a pitch of 3-inch intermeshing with a solid flighted screw. The latter arrangement is cheaper to produce and consequently arrangements employing solid and hollow flighted screws may well be more desirable than those using all hollow flighted screws or all solid flighted screws. Several alternative arrangements will be described hereinafter by way of example.

It is customary to manufacture screws by weldments of various metals and except for the bore and outside diameter of the flights, these weldments are not usually machined or the surfaces finished except for polishing and the cleaning of welds.

It follows, therefore, that there can be rather wide tolerances as to pitch and flight thicknesses and uniformity of a true helix. To compensate for these variations, the axial movement of the screws is preferably brought about resiliently for instance with springs 25, 25A in FIG. 7. The axial travel is designed to exceed the distance between faces to allow a dwell at each end of the strokes so that when the screws engage each other, they are allowed by the resilient action of the springs to remain intimately pressed against one another so that the high and low spots due to the tolerances of manufacture will get the benefit of the cleaning and scraping action whilst the screws are in contact. To illustrate this suppose a stroke of 2.5 inches is required but the crank pin has been offset from the center 32 by an amount corresponding to a stroke of 3 inches. At the end of the 2.5 inch stroke the faces of the flights are engaging one another and during the time it takes for the stroke to effectively reach 3 inches and return to 2.5 inches the intimate contact between the faces is maintained and the motion of the stroke is absorbed by the springs 25, 25A. Suppose, as example, a stroke is achieved every 30 seconds, i.e., 2 strokes per minute, then the total travel for two strokes is 12 inches (4 by 3 inches) and 2 inches (0.5 inches by 4 ) of this 12 inches is absorbed by the springs 25, 25A so that for 10 seconds out of every 1 minute the flights are in intimate contact. If the screws are rotated at 6 r.p.m. the time during which the flights are in intimate contact (10 seconds for every minute) corresponds to one full revolution of the flight. At one end of the stroke the leading faces of the flights are cleaned and at the other end of the stroke the lagging faces of the flights are cleaned. Because of these conditions, screws that are alternately right-hand and left-hand are superior to adjacent screws that would be either both right or both left-hand. To mention one advantage, if both screws were right-hand, they would be rotating in the same direction and at the same surface speed in relation to each other. Whereas, when one is right-hand and one is left-hand, the particle mass in between that is being scraped from the surface is subjected to a speed differential between the two facing flight surfaces.

At one end of the axial stroke the flights will clean one side of each other and, at the opposite end of the same stroke, they will clean the opposite sides of each other and during the stroke the periphery of one flight is engaging the outside diameter of the standard of the other flight, and will clean off the material that tends to adhere to the standard. Simultaneously, the periphery of the flights that are in close engagement with the housing will clean off the material from the wall of the housing.

The combination of a resilient stroke and an adjustable length of stroke gives great flexibility to the applications of the apparatus. The time of, and the amount of frictional contact between the flights can be accurately regulated to suit the application intended. The frequency of axial displacement can also be varied.

Another advantage of this apparatus is that the axial stroke can be adjusted if desired so that the flights do not actually engage one another. For example, with an available distance of axial movement of 2.5 inches suppose only part is used, for instance 1.25 inches. In this case the material that would lie between the faces of the flights would be compressed alternately as the screws move to either side of the apparatus. The action of the stroke can limit this compression to a relatively small part of the circumference of the flights and as the flights are rotating the material is momentarily compressed and then carried by the flights into a free zone and thus allowed to decompress. This makes for a more intimate contact of the material with the flights and if the flights are hollow and have a heat exchange medium within them, this momentary short stroke action will give a momentary intimate contact of the material with the face of the flight to increase the efficiency of the heat exchange.

Although the arrangement of screws in FIG. 7 shows either four solid flighted screws 1 to 4, both solid flighted and hollow flighted screws can be provided in one installation as shown by way of example in FIG. 11. Referring to FIG. 11 four screws are again shown with axes lying in one plane. On the left-hand side of the FIG. a right-handed solid flighted screw 1B is located alongside a left-handed hollow flighted screw 2B, a right-handed solid flighted screw 3B is located alongside the screw 2B and a left-handed hollow flighted screw 4B located alongside the screw 3B. In the center of the FIG. a right-handed hollow-flighted screw 1C is located alongside a left-handed solid flighted screw 2C, a right-handed hollow flighted screw 3C is located alongside the screw 2C, and a left-handed solid flighted screw 4C is located alongside the screw 3C.

On the right hand side of the FIG. a right-handed hollow-flighted screw 1D is located alongside a left-handed solid flighted screw 2D, a right-handed solid flighted screw 3D is located alongside the screw 2D and a left-handed hollow flighted screw 4D is located alongside the screw 3D.

FIG. 12 shows four hollow screws.

If desired, the housing may be arranged for movement relatively to the screws and shaped to maintain contact with the screws during movement of the housing so that the screws more effectively clean the housing. Thus, for example, as shown in FIG. 13 the housing has two straight flat sides parallel to each other. By moving the housing by rack 50 and pinion 51 the walls of the housing are scraped by the screws.

We claim:

1. A screw conveyor or apparatus comprising:
 a. a housing having an inlet and an outlet;
 b. a plurality of screw conveyors rotatably mounted within said housing with their flights in an overlapping relationship, at least one of the conveyors being axially movable to an extent such that each helical flight of one screw conveyor can contact adjacent flights of the other conveyor;
 c. resilient means arranged to absorb axial thrust of the axially movable screw conveyor; and
 d. driving means for rotating the screw conveyors, and for causing said at least one axially movable screw conveyor to move back and forth in alternate axial directions with a stroke greater than the median distance between the face of one of the flights of said axially movable screw conveyor and an adjacent face of one of the flights of the adjacent screw conveyor, whereby at the ends of the stroke, the resilient means permits absorption of axial thrust and allows said at least one axially movable screw conveyor to dwell at the ends of the stroke for a certain time with its flights in contact with the flights of the adjacent screw conveyor.

2. An apparatus according to claim 1, wherein at least one screw conveyor has a left-handed spiral and meshes with at least one screw conveyor which has a right-handed spiral.

3. An apparatus according to claim 1, wherein a pipe standard is provided for each screw conveyor onto which pipe standard the flights are mounted and the periphery of the flights of one screw conveyor are in cleaning relation to the pipe standard of the next adjacent screw conveyor, and the faces of the flights of the axially movable screw conveyor are brought into cleaning relation to the faces of the next adjacent screw conveyor during each stroke of axial movement.

4. An apparatus according to claim 1, wherein there is provided means for adjusting the length of the stroke of said axially movable screw conveyor.

5. An apparatus according to claim 1, wherein the driving means drives adjacent screw conveyors in opposite axial directions.

6. An apparatus according to claim 1, wherein the driving means drive all the screw conveyors rotatably and axially and drive adjacent screw conveyors in opposite axial directions, and there is provided means for adjusting the length of the axial stroke of the screw conveyors.

7. An apparatus according to claim 1, wherein a pipe standard is provided for each screw conveyor onto which the flights are mounted, the axial driving means drive all the screw conveyors in reciprocal movement in an axial direction, and drive adjacent screw conveyors in opposite axial directions, and there is provided means for adjusting the length of the axial stroke of the screw conveyors, and wherein the periphery of the flights of each screw conveyor is in cleaning relationship to the pipe standard of the next adjacent screw conveyor and the faces of the flights of each screw conveyor are brought into frictional contact with the corresponding faces of the next adjacent screw conveyor during each stroke.

8. An apparatus as claimed in claim 1, wherein the housing is movable relatively to the screws and the housing has at least one surface shaped to maintain contact with the screws during the movement of the housing.

9. An apparatus according to claim 1, wherein a pipe standard is provided for each screw conveyor onto which pipe standard the flights are mounted, and at least one screw conveyor adjacent the inner surface of the housing is arranged so that the periphery of its flights are in cleaning relationship with the inner surface of the housing.